Oct. 13, 1936.   J. M. LIPTAY   2,057,197
VENDING VEHICLE
Filed Jan. 30, 1935   7 Sheets-Sheet 1

INVENTOR
John M. Liptay
BY
ATTORNEYS

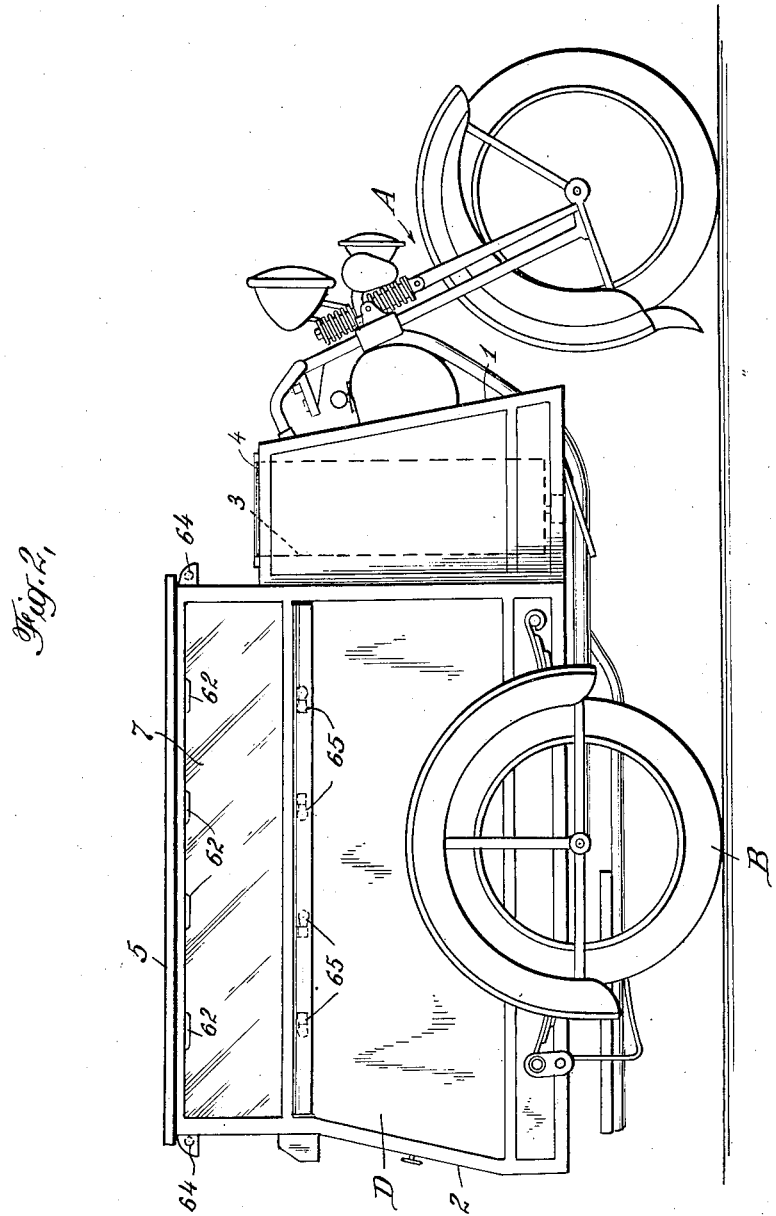

Oct. 13, 1936.   J. M. LIPTAY   2,057,197
VENDING VEHICLE
Filed Jan. 30, 1935   7 Sheets-Sheet 3
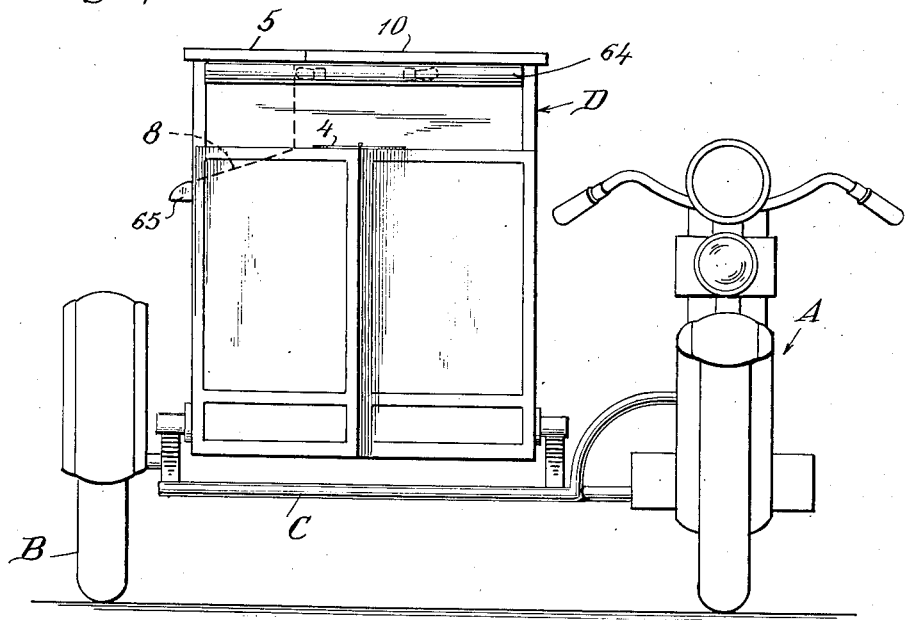
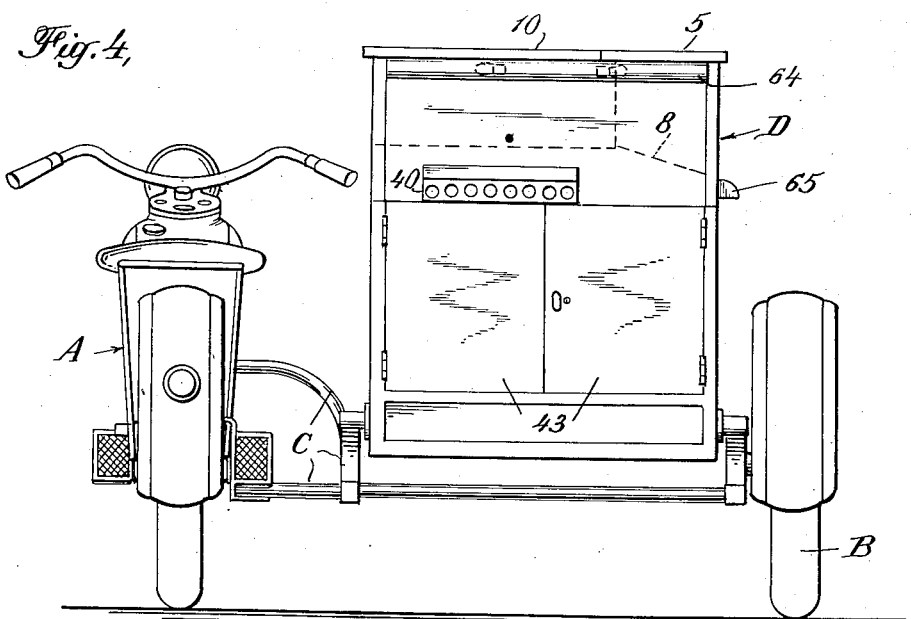

Oct. 13, 1936.  J. M. LIPTAY  2,057,197
VENDING VEHICLE
Filed Jan. 30, 1935  7 Sheets-Sheet 4
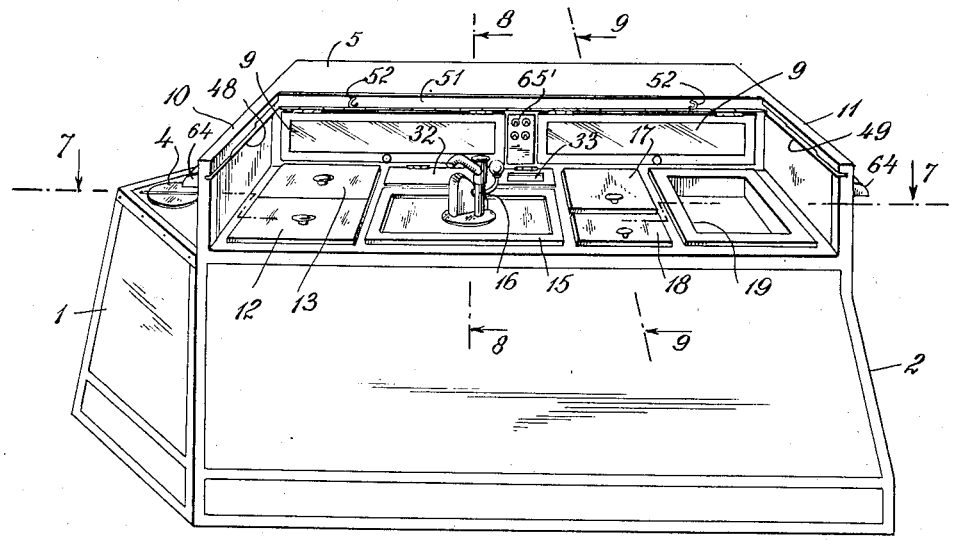
Fig. 5,
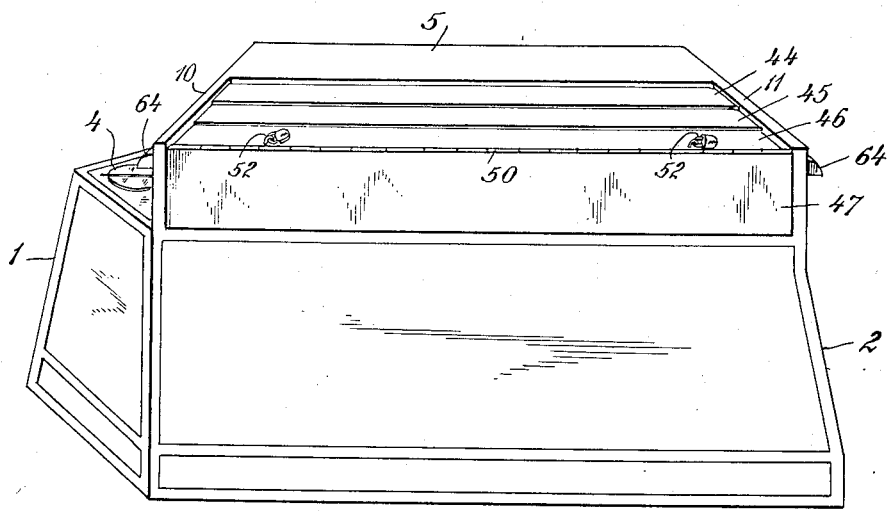
Fig. 6,
INVENTOR
John M. Liptay
BY
ATTORNEYS

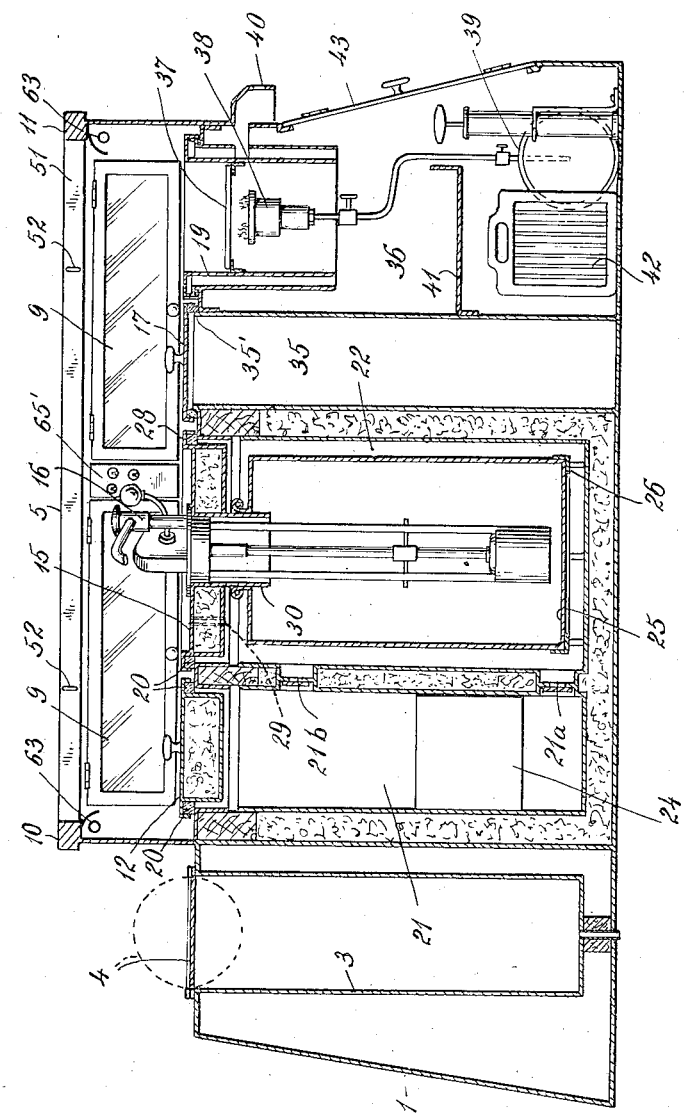

Oct. 13, 1936.    J. M. LIPTAY    2,057,197
VENDING VEHICLE
Filed Jan. 30, 1935    7 Sheets-Sheet 6
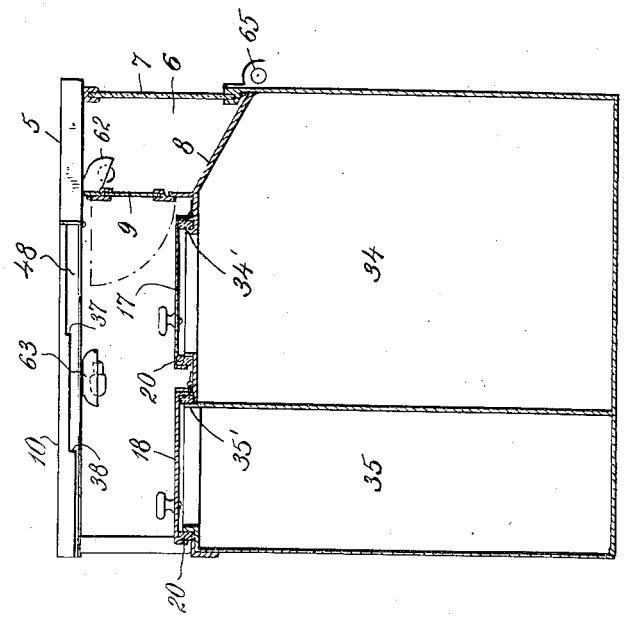
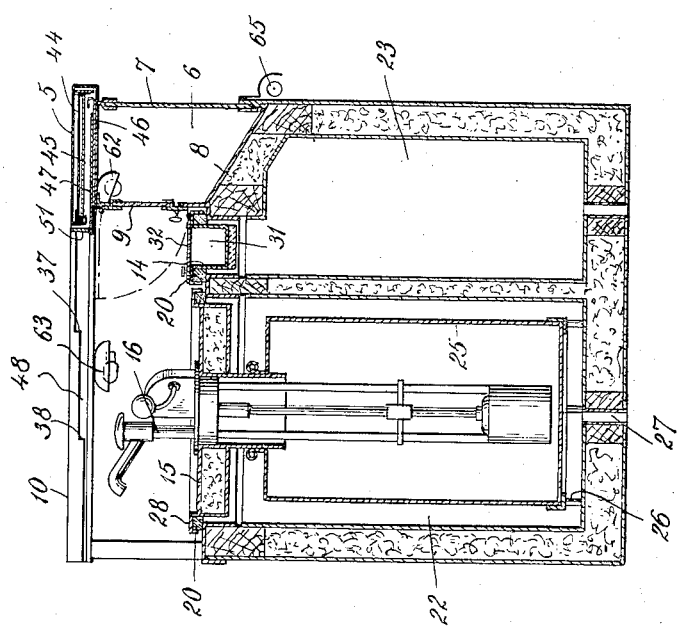
INVENTOR
John M. Liptay
BY
ATTORNEYS Oct. 13, 1936.                J. M. LIPTAY                2,057,197
                             VENDING VEHICLE
                          Filed Jan. 30, 1935          7 Sheets-Sheet 7
Fig. 10,
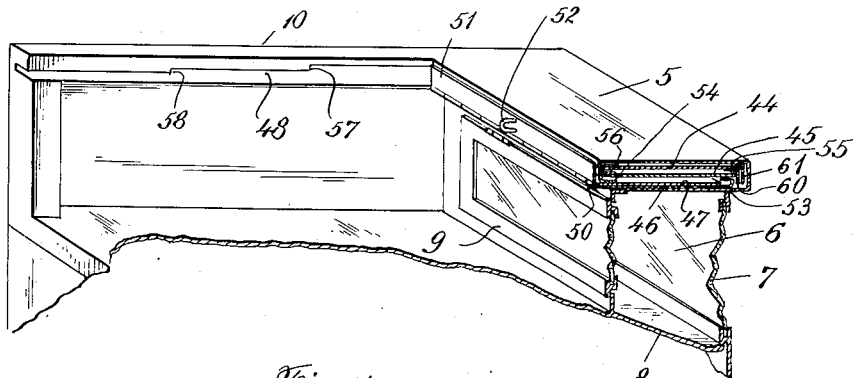
Fig. 11,
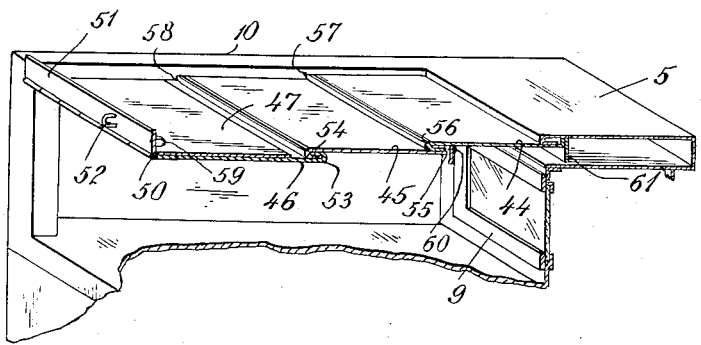
Fig. 12
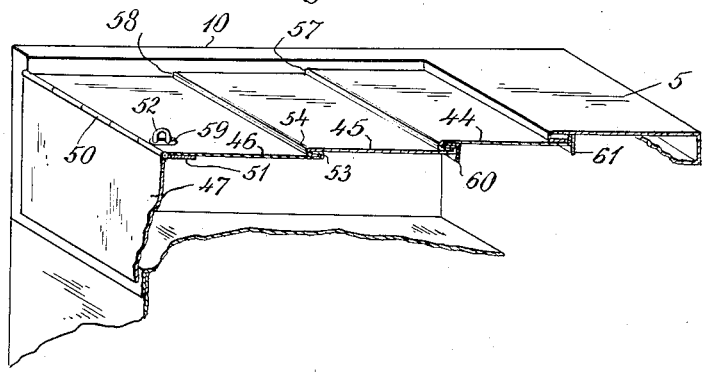
INVENTOR
John M. Liptay
BY
ATTORNEYS Patented Oct. 13, 1936

2,057,197

UNITED STATES PATENT OFFICE 2,057,197

VENDING VEHICLE

John M. Liptay, Crestwood, N. Y.

Application January 30, 1935, Serial No. 4,050

15 Claims. (Cl. 208—45)

This invention relates to vehicles for storing, transporting, displaying and vending refreshments, such as sandwiches, ice cream, beverages, and the like.

Such vehicles are quite extensively used for facilitating the transportation of refreshments to, and their sale at, places of amusement, parks, public highways, etc. The simpler types of these refreshment vehicles take the form of hand-pushed carts, others are horse drawn, while the more elaborate ones are automobiles suitably equipped for the purpose. However, there is a demand for a refreshment vehicle, or so-called lunch counter, which is self propelled, in order that the goods to be vended may be easily and quickly transported to the desired location, and which at the same time may be placed at the disposal of the vendor at less cost than the automobile type, which is more economical to operate and maintain than the automobile type, and which may be dispatched to the desired location with greater facility and speed than the automobile type. The structure for storing, displaying and vending the desired articles should be of compact design in keeping with the nature of the propulsion means and yet it should have ample facilities for storing the various articles, for preserving the food stuffs, for displaying them and for conveniently serving them.

The principal object of the invention is to provide a self-propelled refreshment vehicle, or lunch counter, which will answer the above mentioned requirements.

Another object is to improve the facilities for storing, preserving, displaying and vending the desired articles regardless of the type of propulsion means employed.

Other objects of the invention will hereinafter appear.

A motor cycle is well adapted to meet the requirements of the invention, so far as the propulsion means is concerned, and my invention in its preferred form contemplates propulsion means of this type. In the preferred embodiment of the invention the structure for storing, preserving, displaying and vending the articles, takes the form of a compact box-like unit associated with the motor cycle in much the same manner as the usual motor cycle side car. The construction of this unit, in its entirety and as to its component parts, will be made clear from the following detailed description, as will also the manner in which the objects of the invention are fulfilled by the design and construction of the unit and its various parts, by the manner in which the unit is associated with the motor cycle, and by the relation of the parts with respect to one another and with respect to the motor cycle, the attendant's station, and the customer's position.

One embodiment of the invention is illustrated in the accompanying drawings, in which Figure 1 is a plan view of the improved refreshment vehicle;

Fig. 2 is a side elevation as viewed from the customer's position;

Figs. 3 and 4 are front and rear elevations, respectively;

Fig. 5 is a perspective view of the storage, display and vending unit, disassociated from the motor cycle, and as it appears from the attendant's station;

Fig. 6 is a view similar to Fig. 5 showing the cover for the working counter in its closed position;

Fig. 7 is a longitudinal section taken on the line 7—7 of Fig. 5;

Fig. 8 is a transverse section taken on the line 8—8 of Fig. 5;

Fig. 9 is a transverse section taken on the line 9—9 of Fig. 5;

Fig. 10 is a broken perspective view of one corner of the device showing the manner in which the cover for the working counter telescopes under and is concealed by the serving counter; and Figs. 11 and 12 are views corresponding with Fig. 10 illustrating the operation of the cover and the manner in which it is moved to its closed position.

Figure 1:
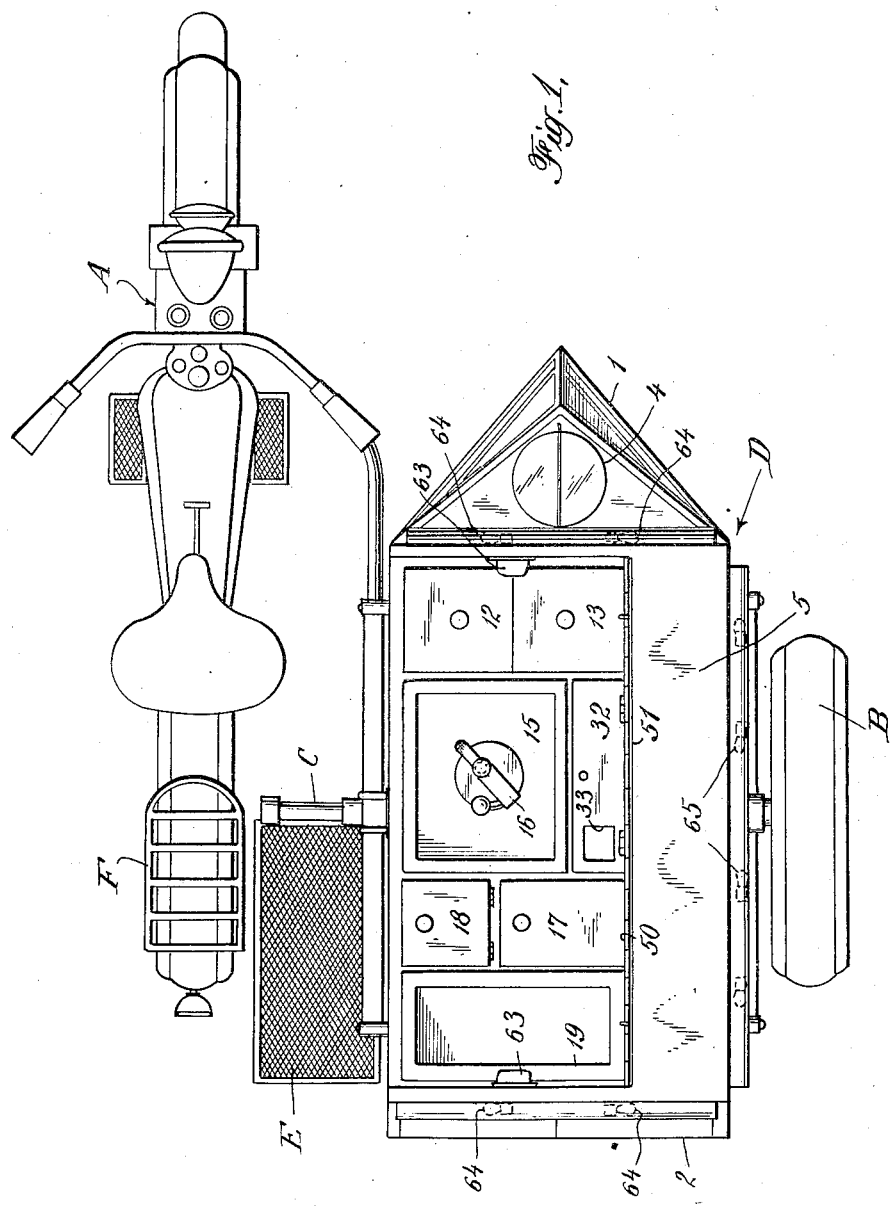

As will be apparent from Figs. 1 to 4, inclusive, the general arrangement and association of the parts somewhat resembles a motor cycle of the side car type, except that the third wheel and the extension frame on which it is mounted carry the above mentioned box-like unit instead of a side car.

In Figs. 1 to 4, inclusive, the motor cycle is denoted in general by the reference letter A. It may be of standard construction and therefore does not require detailed description. The third wheel is shown at B, and the extension frame on which it is mounted is denoted in general by the reference letter C. The third wheel B and the extension frame C support the box-like unit D, which contains the various facilities for storing, preserving, displaying and vending the desired articles such as frankfurters, sandwiches, ice cream, beverages, cake, etc. The attendant's station while serving customers is on a platform E (Fig. 1) located between the motor cycle and the box-like unit D, a seat F being provided over the rear wheel of the motor cycle upon which the attendant may be seated when not serving customers. The customer's position is at that side of the device where the third wheel B is located, i. e., that side which is shown in elevation in Fig. 2. It is along this side of the device that extends the display case and the serving counter as will hereinafter appear.

The unit D is a box-like structure having stream lines with a pointed front 1 and a sloping back 2. The pointed forward end affords a convenient location for a waste receptacle 3 (Figs. 2 and 7) having a self closing cover 4. The outer upper edge portion of the unit D constitutes a serving counter 5 below which is located a display case 6. The front wall of the display case comprises a vertical glass panel 7 through which the articles in the show case may be viewed as they rest on the inclined bottom 8 of the display case. The inner vertical wall of the display case is provided with a pair of hinged doors 9 to permit access to the display case by the attendant. These doors are preferably hinged at their upper edges and remain closed by gravity. The attendant opens them by swinging them inwardly and upwardly as represented in Figs. 8 and 9.

As best shown in Fig. 5 the display case, in conjunction with upstanding end walls 10 and 11, enclose the working counter on the three sides of the unit opposite the attendant, the working counter being depressed below the level of the serving counter 5 and the upper edges of the side walls 10 and 11.

On the working counter there is a pair of covers 12 and 13 (Fig. 5) for a compartment which is suitable for storing and preserving such things as ice cream, ices, etc., also a cover 14 for a cold storage compartment for such things as frankfurters, meats and other articles which should be maintained at a relatively low temperature; a cover 15 for a beverage compartment and a beverage dispenser 16, covers 17 and 18, for normal temperature compartments in which may be stored bread, rolls, cakes, paper cups, etc., and finally a well 19 in which is located a hot plate or grill. The covers 12, 13, 14 and 15 for the refrigerator compartments are of the insulated type as shown in Figs. 7 and 8 and all of the covers are so constructed that there is no metallic heat conductivity between the inside shells of each compartment and the cover, counter or body of the device. Insulating material 20 serves to space the metallic surface of each cover from the metallic surface of the working counter and body of the device.

The compartments closed by the covers 12, 13, 14 and 15 are all heavily insulated refrigerator compartments as shown in Figs. 7 and 8. The compartment for ice cream, and the like, closed by the covers 12 and 13 is shown at 21, in Fig. 7. The beverage compartment, closed by the cover 15, is shown at 22 in Figs. 7 and 8, and the cold storage compartment, closed by the cover 14, is shown at 23 in Fig. 8. The ice cream compartment 21 contains a sub-compartment or holder 24 for dry ice, the ice cream compartment 21 being so designed and constructed that the dry ice will maintain a temperature in the ice cream compartment of approximately 0° F.

Within the beverage compartment 22 there is a beverage container 25 supported on a self seating raised rim 26 so that it may be cooled on all sides and the top and bottom by ice placed in the compartment around the container. Instead of placing ice in the compartment 22 this compartment may be cooled, if desired, by the dry ice in compartment 21, a circulation between the two compartments being maintained for this purpose through the thermostatically controlled openings 21a and 21b (Fig. 7). The design and construction of the beverage compartment is such that an approximate temperature of 35° F. may be maintained in it. The bottom of the beverage compartment 22 is provided with an insulated drain 27. The cover 15 of the beverage compartment has a raised edge 28 which forms a tray to collect the drip or overflow from the beverage pump. The drain of the tray flows into the ice compartment below through a tube 29 extending through the cover 15. A collar 30 on the underside of the cover 15 fits snugly into the beverage container 25 and prevents the contents from splashing out. The beverage compartment may be used for chilled beverages, such as orangeade, and the like, or it may be used for coffee, and other heated beverages, the temperature of which may be maintained by the fireless cooker method by inserting a piece of heated soap-stone in the bottom of the compartment.

The cover 14 of the cold storage compartment 23 for frankfurters, meats, and the like, is depressed or recessed as shown at 31 (Fig. 8) and is provided with a hinged lid 32. In this recess of the cover 14 may be stored the knife, fork, towel, and other accessories. One end of the lid 32 is preferably cut out, as shown at 33, (Figs. 1 and 5) to receive the mustard container.

The normal temperature compartments, closed by the covers 17 and 18, are shown at 34 and 35 in Fig. 9, the compartment 35 also appearing in the longitudinal section of Fig. 7. These compartments preferably have raised rims 34' and 35' over which the covers fit to prevent water from running into the compartments and damaging the articles stored therein. The last compartment 36 at the rear of the device, and which is located adjacent to the normal temperature compartments 34 and 35, contains the hot plate or grill 37 located in the insulated well 19 (Fig. 7). The plate 37 is heated by a burner 38 supplied with fuel from a tank 39, also located in the compartment 36. An insulated heat discharge box 40 is located at the rear of the device and communicates with the interior of the well 19 by an insulated duct to discharge the excess heat from the burner 38. There is no metallic contact between the hot plate 37, well 19, the duct or the heat discharge box and the working counter or body of the device. All heated parts are thoroughly insulated so that there will be no heat conductivity from the heat compartment to the other compartments. Within the compartment 36 may also be located a storage shelf 41 and a storage battery 42 to supply current to the lights hereinafter described. Tools and other equipment may be carried in this compartment. Access to the rear compartment 36 may be had through a pair of hinged doors 43 at the rear of the device (Figs. 4 and 7).

For closing the working counter and rendering all parts of the device inaccessible there is provided a telescopic disappearing cover shown in Figs. 5, 6, 10, 11, and 12. In its preferred form the cover comprises a series of sliding plates 44, 45, 46 and 47, the ends of which are guided in slots 48 and 49 provided in the end walls 10 and 11. When the cover is open these plates are in superposed relation under the serving counter 5 and are concealed thereby. The innermost plates 46 and 47 are hinged, as shown at 50, and the end plate 47 is normally folded back so that it lies over the plate 46, as best shown in Fig. 11. The end plate 47 is provided with an upstanding vertical flange 51 which, when the cover is telescoped under the cover 5, serves as a closure for the opening into which the cover telescopes. The flange 51 is provided with a pair of handles 52 by which the cover may be withdrawn from under the serving counter 5, and these handles also serve as hasps by which the cover may be locked as hereinafter described. By pulling on the handles 52 the hinged plates 46 and 47 slide from under the serving counter 5, and after these plates have moved a distance equal to their width, a hooked rear edge 53 on the plate 46 engages with a corresponding hooked edge 54 at the front of plate 45 and pulls this plate forward. Likewise, a hooked rear edge 55 on the plate 45 engages with a correspondingly hooked edge 56 at the front of plate 44 and pulls this plate forward. The forward movement of the plate 44 is limited by shoulders 57 in the grooves 48 and 49, and the forward movement of the plate 45 is limited by shoulders 58 in these grooves. When the plates have been moved in a horizontal direction as far as they will go, the plate 47 is swung upwardly and then downwardly about the hinge 50 until it lies in a vertical plane, as shown in Fig. 12 and thereby closes the vertical opening along the attendant's side of the work counter. The vertical flange 51 on the plate 47 then lies under the forward edge of the plate 46 and in moving to this position the handles 52 project through a pair of openings 59 and serve as hasps. Padlocks may be applied to these hasps and when so applied the entire cover is locked in position and access to the working counter and to the display case 6 is prevented. In opening the cover it is only necessary to reverse the operation, i. e., remove the padlocks from the hasps 52 and then swing the plate 47 upwardly and downwardly until it rests on plate 46, and then push the plates back into the compartment under the serving counter 5. Vertical flanges 60 and 61 at the rear edges of plates 45 and 44, respectively, serve to retain the rear edges of these plates at the proper elevation as they slide to and fro. Fig. 6 shows in perspective the appearance of the device when the cover is closed and locked in position.

Shaded electric lamps 62 are preferably provided inside of the display case and are so arranged as to illuminate the interior of the show case and also the work counter through the glass doors 9. Other shaded lamps 63 may be provided at the inner surface of the end walls 10 and 11 to assist in illuminating the work counter, and to illuminate the full depth of the ice cream compartment and the hot plate well. Shaded lamps 64 may be provided at the exterior of the end walls 10 and 11 to illuminate advertisements which may be placed on the outer surfaces of these walls. Likewise, shaded lamps 65 may be provided to illuminate the wall surface under the display case, which may likewise be used for advertising purposes. All of the lamps are controlled from a switch panel 65' which may be conveniently located between the doors 9 as shown in Figs. 5 and 7.

The entire box-like unit is preferably given an attractive and appealing appearance. For instance, the serving counter may be of stainless steel, and the surface of the compartment covers, the surface of the working table and the metal edgings may also be stainless steel, or chromium, or other polished and durable metal. The other surfaces, such as the enclosing walls of the box-like unit preferably have a white porcelain or enamel finish.

It will now be seen that the various compartments are so designed, constructed and related that the hottest portion of the device, where the grill is located, is at one end, and the coldest refrigerator compartment, for ice cream, and the like, is at the other end. Next to the ice cream compartment are located the beverage and cold storage compartments which need not be maintained at such a low temperature as the ice cream compartment. Interposed between the beverage and cold storage compartments on the one hand, and the grill compartment on the other hand are the normal temperature compartments which serve to prevent the heat from the grill from having any appreciable effect on the beverage and cold storage compartments.

The entire device, being small and compact, may be stored in a small space and may be maintained at low cost. It may be placed at the disposal of persons wishing to pursue the refreshment vending business at much less cost than similar devices of the automobile type. It may be quickly and economically transported to and from the places where it is desired to vend the articles. Notwithstanding these considerations the device affords all the necessary conveniences for storing, preserving, displaying and vending the various things that are usually sold at light lunch counters. The work counter is conveniently accessible to the attendant from his position on the platform adjacent the rear wheel of the motor cycle, and all parts of the work counter are within easy reach. Likewise, the serving counter is within easy reach of the attendant and is conveniently located from the standpoint of the customer. It will be noted that the arrangement is such that the attendant's platform and seat, and also the serving counter and work counter are all in substantial alignment with the two rear wheels. When the cover is closed all parts of the work counter are concealed and protected and it prevents access to the display case and to any of the food or merchandise in the compartments. It will also be seen from the foregoing description that the compartments are in a line of progressively increasing temperature from the ice cream compartment at one end to the grill compartment at the other end.

I claim:

1. A vending vehicle comprising a motorcycle having a third wheel, and a vending structure located between the motor cycle and the third wheel, said vending structure comprising a longitudinally extending serving counter adjacent the third wheel and a longitudinally extending work counter between the serving counter and the motorcycle.

2. A vending vehicle comprising a motorcycle having a third wheel, and vending structure located between the motorcycle and third wheel, said vending structure comprising a longitudinally extending serving counter adjacent the third wheel and a longitudinally extending work counter between the serving counter and the motorcycle, and an attendant's platform located between the motor cycle and the work counter.

3. A vending vehicle comprising a motor cycle having a third wheel, and vending structure located between the motorcycle and the third wheel, said vending structure comprising a longitudinally extending serving counter adjacent the third wheel, and a longitudinally extending work counter between the serving counter and the motorcycle, and an attendant's platform located between the motorcycle and the work counter, all portions of the work counter being within easy reach of an attendant standing on said platform.

4. A vending vehicle comprising a motorcycle having a third wheel, and vending structure located between the motorcycle and the third wheel, said vending structure comprising a longitudinally extending serving counter adjacent the third wheel, a longitudinally extending display case located below the serving counter, and a work counter between the display case and the motorcycle.

5. A vending vehicle comprising a motorcycle having front and rear wheels, a side frame extending laterally from the motorcycle, a third wheel carried by said frame substantially in alignment with the rear wheel of the motorcycle, and vending structure located between the motorcycle and said third wheel and comprising a longitudinally extending serving counter and a longitudinally extending work counter both of which are substantially in alignment with the rear wheel of the motorcycle and said third wheel.

6. A vending vehicle comprising a motorcycle having front and rear wheels, a side frame extending laterally from the motorcycle, a third wheel carried by said frame substantially in alignment with the rear wheel of the motorcycle, vending structure located between the motorcycle and said third wheel and comprising a longitudinally extending serving counter, a longitudinally extending work counter, and an attendant's platform between the work counter and the rear wheel of the motorcycle, said counters and said platform being substantially in alignment with the rear wheel of the motorcycle and said third wheel.

7. A vending vehicle comprising a motorcycle having front and rear wheels, a side frame extending laterally from the motorcycle, a third wheel carried by said frame substantially in alignment with the rear wheel of the motorcycle, vending structure located between the motorcycle and said third wheel and comprising a longitudinally extending serving counter, a longitudinally extending work counter, and an attendant's platform between the work counter and the rear wheel, and an attendant's seat adjacent said platform, said counters, platform and seat being substantially in alignment with the rear wheel of the motorcycle and said third wheel.

8. A vending vehicle comprising a motorcycle having a third wheel, and a vending structure located between the motorcycle and the third wheel, said vending structure comprising a serving counter, a longitudinally extending work counter between the serving counter and the motorcycle, a longitudinally extending display case adjacent the third wheel along the outside edge of said work counter and extending vertically above the same, and transverse end walls disposed at right angles to the display case and extending vertically above the work counter such that in conjunction with the display case they enclose the work counter on three sides.

9. A vending vehicle in accordance with claim 8 in which the longitudinally extending serving counter is disposed above the display case.

10. A vending vehicle comprising a motorcycle having a third wheel, and a vending structure located between the motorcycle and the third wheel, said vending structure being disposed outwardly adjacent the third wheel and having its inner wall spaced from the motorcycle, and a platform between the inner wall and the motorcycle to provide a working station for the attendant.

11. A vending vehicle comprising a motorcycle having a third wheel, and a vending structure located between the motorcycle and the third wheel, said vending structure comprising a longitudinally extending work counter between the third wheel and the motorcycle, a longitudinally extending serving counter along the outer edge of the work counter and disposed at a higher elevation than the work counter, an outside vertical wall closing the space between the serving counter and the work counter, transverse end walls extending vertically above the ends of the work counter, and a disappearing telescopic cover normally concealed beneath the serving counter and being extensible such that a portion thereof will lie substantially in the horizontal plane of the upper edges of the end walls and another portion will lie substantially in the vertical plane of the inside vertical edges of the end walls whereby said cover in conjunction with said outside vertical walls, serving counter and end walls will completely close access to the work counter.

12. A vending vehicle comprising a motorcycle having a third wheel, and a vending structure located between the motorcycle and the third wheel, said vending structure comprising a longitudinally extending work counter between the third wheel and the motorcycle, a longitudinally extending display case along the outside edge of said work counter adjacent said third wheel and extending vertically above said counter, a longitudinally extending serving counter above the display case, transverse end walls disposed at right angles to the display case and serving counter and extending vertically above the work counter, and a telescopic cover cooperating with the display case, serving counter and end walls to completely close access to the work counter.

13. A vending vehicle comprising a motorcycle having a third wheel, and a vending structure located between the motor cycle and the third wheel, said vending structure comprising a work counter, upstanding walls enclosing the work counter along the outside edge and at the ends, and a telescopic cover cooperating with said walls to completely close access to the work counter, said cover comprising a plurality of plates mounted to slide in a horizontal plane at substantially the level of the upper edges of said walls, the innermost plate being longitudinally connected with the adjacent plate whereby it may be swung to a vertical position to close the vertical opening above the inner edge of the work counter while other plates close the horizontal opening above the work counter.

14. A vending vehicle comprising a motorcycle and a third wheel, and a vending structure located between the motorcycle and the third wheel, said vending structure comprising a work counter, upstanding walls enclosing the work counter along the outside edge and at the ends, and a sliding cover cooperating with said walls to completely close access to the work counter.

15. A vending vehicle comprising a motorcycle, a third wheel attached to said motorcycle, and a vending structure supported on the aforementioned structure, said vending structure including a work counter disposed inwardly of the third wheel, and a serving counter.

JOHN M. LIPTAY.